United States Patent
Rodríguez Angoli et al.

(10) Patent No.: US 11,578,388 B2
(45) Date of Patent: Feb. 14, 2023

(54) LEAD-FREE COPPER-ZINC ALLOY THAT CAN WITHSTAND THE MARINE ENVIRONMENT

(71) Applicant: NACIONAL DE COBRE, S.A. DE C.V., Mexico City (MX)

(72) Inventors: Jamie Rodríguez Angoli, Guanajuato (MX); Andrés Rangel García, Guanajuato (MX); Juan Pedro García Lara, Guanajuato (MX)

(73) Assignee: NACIONAL DE COBRE, S.A. DE C.V., Mexico City (MX)

( * ) Notice: Subject to any disclaimer, the term of this patent is extended or adjusted under 35 U.S.C. 154(b) by 0 days.

(21) Appl. No.: 17/052,443

(22) PCT Filed: Jun. 5, 2019

(86) PCT No.: PCT/MX2019/000067
§ 371 (c)(1),
(2) Date: Nov. 2, 2020

(87) PCT Pub. No.: WO2020/153834
PCT Pub. Date: Jul. 30, 2020

(65) Prior Publication Data
US 2021/0164073 A1    Jun. 3, 2021

(30) Foreign Application Priority Data
Jan. 22, 2019 (MX) .................. MX/A/2019/000947

(51) Int. Cl.
| | | |
|---|---|---|
| *C22C 9/04* | (2006.01) | |
| *C21D 9/60* | (2006.01) | |
| *C22F 1/08* | (2006.01) | |
| *A01K 74/00* | (2006.01) | |

(52) U.S. Cl.
CPC ............... *C22C 9/04* (2013.01); *A01K 74/00* (2013.01); *C21D 9/60* (2013.01); *C22F 1/08* (2013.01)

(58) Field of Classification Search
CPC .......... C22C 9/04; A01K 74/00; A01K 61/00; C21D 9/60; C22F 1/08; Y02P 10/25
See application file for complete search history.

(56) References Cited

U.S. PATENT DOCUMENTS

| | | | | |
|---|---|---|---|---|
| 5,653,827 | A * | 8/1997 | Kramer | ..................... C22C 9/04 420/475 |
| 9,702,027 | B2 * | 7/2017 | Kaeufler | .................. C22C 1/10 |
| 2004/0234412 | A1 | 11/2004 | Oishi et al. | |

(Continued)

FOREIGN PATENT DOCUMENTS

| | | |
|---|---|---|
| ES | 2 564 974 | 3/2016 |
| WO | WO 2013073785 | 5/2013 |
| WO | WO 2018088721 | 5/2018 |

OTHER PUBLICATIONS

PCT International Search Report and Written Opinion (w/ English translation) for corresponding PCT Application No. PCT/MX2019/000067, dated Sep. 9, 2019, 17 pages.

*Primary Examiner* — John A Hevey
(74) *Attorney, Agent, or Firm* — Dority & Manning, P.A.

(57) ABSTRACT

The invention provides a copper-zinc alloy with low lead content useful in the manufacture of wire used in the manufacture of cages for aquaculture, where said wire suffers the least deterioration due to loss of zinc during exposure to stagnant water, water of little movement or sea waters.

11 Claims, 3 Drawing Sheets

(56) References Cited

U.S. PATENT DOCUMENTS

| | | | |
|---|---|---|---|
| 2013/0115128 A1* | 5/2013 | Lawrence | C22C 1/02 |
| | | | 420/476 |
| 2014/0161661 A1 | 6/2014 | Kuhn et al. | |
| 2014/0166164 A1 | 6/2014 | Oishi et al. | |
| 2014/0251488 A1* | 9/2014 | Oishi | C22C 9/04 |
| | | | 138/177 |
| 2016/0201164 A1 | 7/2016 | Keiichiro et al. | |

\* cited by examiner

LEAD-FREE COPPER-ZINC ALLOY THAT CAN WITHSTAND THE MARINE ENVIRONMENT

PRIORITY CLAIM

This application is a national phase application of International Application No. PCT/MX2019/000067, filed Jun. 5, 2019, which, in turn, is based upon and claims the right of priority to MX Patent Application No. MX/a/2019/000947, filed Jan. 22, 2019, the disclosures of both of which are hereby incorporated by reference herein in their entirety for all purposes.

TECHNICAL FIELD

This invention claims Cu-Zn alloys used for the manufacture of wire with properties resistant to watery environments, especially marine environments that are more aggressive. Such wire is used among other things in the manufacture of cages for aquaculture.

BACKGROUND

Aquaculture has attracted attention because of its importance to offset the stagnation of world catches and increase the supply of animal protein, since it is considered an activity that can enhance the development of fishing communities, and more recently, due to the significant investments it is attracting or due to the negative effects it can have and cause on marine ecosystems.

Just over half of aquaculture production comes from freshwater systems and the remainder from sea waters. Broadly speaking, it includes fish, crustaceans, mollusks and plants, algae, and other sea plant species.

Aquaculture has become decisive for some species of fish, crustaceans, and shellfish. For example, in the early 1990s about 25% of world salmon production came from aquaculture and the trend is increasing. About half of the world's shrimp production is from aquaculture, while world production of mussels and clams has increased by 60% and that of scallops by more than 300% thanks to the development of aquaculture. Thus, Chinese production of aquaculture shrimp and mussels represents 27% and 38% respectively of the global production of these products.

However, these assessments have ignored environmental effects such as pollution and destruction of sea habitats (mainly mangroves) of increasing severity, not only from a purely ecological point of view but also economically by endangering the sustainability of the medium and long-term economic activity. Pollution and overcrowding of freshwater fish farms have had serious negative effects in Asia and Latin America. Pollution is caused by an excessive discharge of nutrients and organic matter that translates into nutrient over-enrichment of ponds. Microbial contamination, accumulation of chemical-toxic products and excessive sedimentation have also been found.

In the last 15 years or so, inland water cage culture has spread to more than 35 countries in Europe, Asia, Africa, and America. Since 1978 more than 70 species of freshwater fish have been experimentally reared in cages. With the exception of a few areas, wood and bamboo have been replaced by new materials, such as nylon, plastic, polyethylene, and steel meshes, which, although they are much more expensive, last longer and allow better water flow.

Today, it is increasingly common to find a greater commitment to health, not only on the part of medical or government institutions, but also on the part of private companies, and society in general.

One of the branches that has acquired great relevance relates to the metallic elements used in aquaculture, where attempts have been made to reduce costs, mainly through the use of steel cages. In general, the materials used for this purpose are conceived in such a way that they not to pollute by using substances that might dissolve in water and cause damage to the environment and people. Consequently, steel cages have been substituted for others built with cheaper materials and superior properties, as is the case of low-lead Cu—Zn alloys with improved properties.

Lead is mainly contained in brass for its contribution to machinability. Lead is prone to chip detachment and breaking. It also works as lubricant at the time of machining, reducing temperatures during cutting and lengthening the life of cutting tools. However, it is a harmful compound that accumulates in the nervous system and is particularly harmful to the mental development of children.

In recent years, efforts have been made to establish standards in lead-containing copper alloys to drastically limit the allowable level of lead in copper alloys.

This had led to the development of low lead copper alloys that have reached levels of 0.02% of weight.

Several low-lead copper alloys are described In the state of the art, such is the case of patent MX331987 claiming a copper alloy sheet containing 28.0% to 35.0% of Zn, from 0.15% to 0.75% of Sn, from 0.005% to 0.05% of P, and Cu and impurities, complying with the ratios of 44=[Zn]+20×[Sn]=37 and 32=[Zn]+9×([Sn]−0.25) 1/2=37. The copper alloy sheet is manufactured by a process that includes cold rolling with an average grain size of the copper alloy material of 2.0 μm to 7.0 μm, and the sum of the ß-phase area ratio of 0% to 0.9%.

The MX330361 patent provides a copper alloy sheet containing 4.5% to 12.0% Zn, 0.40% to 0.90% Sn, 0.01% to 0.08% P, and 0.005% to 0.08% Co and/or 0.03% to 0.85% Ni, the rest is Cu and impurities. The copper alloy sheet is produced by final cold rolling in which a copper alloy material is coldly rolled with an average grain size of 2.0 μm to 8.0 μm, circular or elliptical precipitates and the average particle size of the precipitates is 4.0 nm to 25.0 nm, or a percentage of precipitates with a particle size of 4.0 nm to 25.0 nm represents 70% or more of the precipitates.

Described in MX280502 is an electrical cable conductor for wiring made of a copper alloy material. The copper alloy material is composed of 1.0 to 4.5% Ni, 0.2 to 1.1% Si, 0.1 to 1.5% Zn and the rest of Cu and impurities.

Patent MX 281135 provides a master alloy used in a cast of a modified copper alloy whose grains can be refined during melting-solidification and also a method of casting a modified copper alloy using this, said master alloy contains from 40 to 80% of Cu: from 0.5 to 35% of Zr and the rest of Zn; and Cu from 40 to 80%; Zr from 0.5 to 35%; of P from 0.1 to 3% and the rest Zn.

Patent MX280469 claims a copper-based alloy casting that includes 69 to 88% Cu, 2 to 5% Si, 0.0005 to 0.04% Zr, 0.01 to 0.25% P and the rest includes Zn and impurities. The alloy may also include at least one element selected from the group consisting of 0.001 to 0.2% Mg, 0.003 to 0.1% B, 0.0002 to 0.01% C, 0.001 to 0.2% Ti, and 0.01 to 0.3. % of rare-earth elements.

Pending application MX/a/2017/002396 claims a copper alloy material bathed in tin for a finished product where the surface layer based on Sn is formed on the surface of the base material that is made of copper or a copper alloy.

Finally, application MX/a/2016/001257 refers to a copper alloy for electronic and electrical equipment that has improved mechanical characteristics and the ability to suppress defects, even when processed to the thickness of a thin plate or the diameter of a fine wire. For the above characteristics, the alloy is required to include Mg from 1.3% to 2.8% and the rest is substantially Cu and impurities.

In this sense, there has been growing interest in providing materials with low lead content in water-related components, making it desirable to further reduce the lead content, and increase the resistance to corrosion in a watery environment, making it possible to obtain wire for the manufacture of cages for aquaculture.

Some of the attempts to reduce lead in copper alloys for aquaculture cages involve introducing other elements instead of lead, resulting in machining and finishing problems in the manufacturing process, such as problems in primary casting, primary machining, secondary machining, polishing, coatings, and mechanical assembly. Consequently, there is a need for a low-lead alloy casting solution that provides low-cost alloys that does not degrade mechanical or chemical properties nor significantly disrupts the material manufacturing process leading to problems with finish and cutting.

DESCRIPTION OF THE INVENTION

The present invention aims to provide a low lead content cu-zn alloy useful in the manufacture of wire for the construction of aquaculture cages with low corrosion indices that provides enhanced properties to the wire.

The composition of matter in the present invention comprises approximately: 62% to 63% by weight of Cu; 0.18% to 0.24% by weight of Pb; 0.15% to 0.25% by weight of Sn; 0.03% to 0.08% by weight of Si; 0.10% to 0.15% by weight of P; total of other elements≤0.30%, where Zn is present in a range of approximately 36% to 38%. This composition of matter allows restricting the amount of Beta phase generated and thus avoid that the materials suffer the least deterioration due to loss of zinc during their exposure to stagnant waters, waters with little movement or sea waters. This dezincification effect is noticeably greater in alloys containing higher amounts of beta phase or thick and interrelated bands.

DETAILED DESCRIPTION OF THE INVENTION

Figure 1:
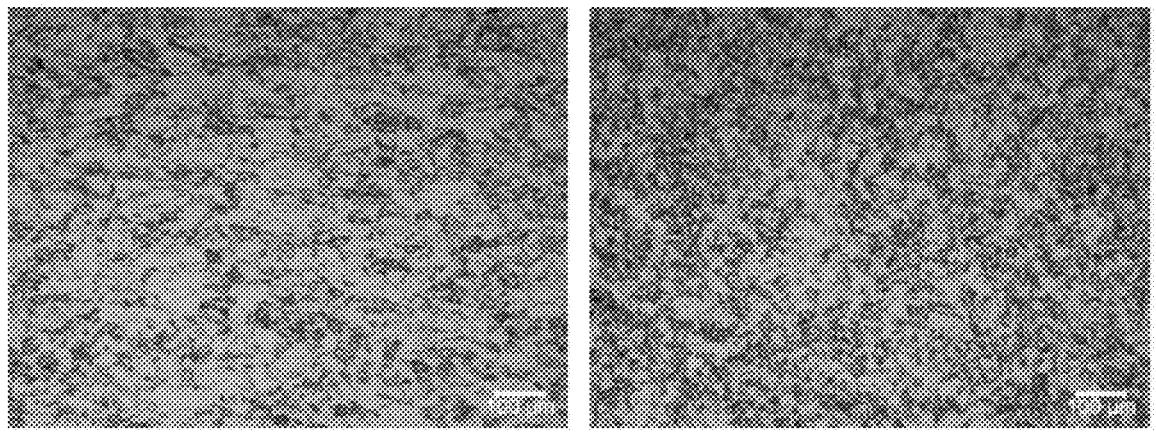
FIG. 1 is a micrograph of the 4 mm wire: a) longitudinal section and b) cross section, 100×.

Preferably the alloy of the present invention comprises between about 64% to 66.15% Cu; between 32% to 34.5% of Zinc, with an impurity content of 0.5% to 2% mainly Pb, Sn, Ni, Sb; Fe. With this composition, the minimum requirements necessary to be considered an alloy with low corrosion and lead-free are perfectly met for use in the manufacture of wires for marine aquaculture cages. It is also significant because it increases the machinability of the alloy, which will aid chip breakage and lubrication during wire machining to the normally required thickness of 4 mm.

This alloy contains a relatively low amount of Beta phase to favor its machining, but enough to always maintain an acceptable level of hot forgeability.

An alloy containing 65.5% Cu, 32.63% Zn, 0.534% Sn, 0.251% Sb and 1.20% Ni, for which its Zinceq results in 33.87. It was prepared according to the procedure described below and then it was used for the manufacture of a wire with a diameter of 4 mm, which is normally used for the construction of cages in aquaculture.

In the optical emission spectrometer test to determine the composition of the manufactured 4 mm wire, a flat surface is prepared by cutting and machining, and three points were analyzed to average three analyzes. Table 1 shows the average of the chemical analysis.

TABLE 1

| Chemical analysis, average of three analyses, % weight | | | | | | |
|---|---|---|---|---|---|---|
| Zn | Pb | Sn | P | Mn | Fe | Ni |
| 32.63 | 0.00786 | 0.534 | 0.00344 | <0.001 | 0.0281 | 1.20 |
| Si | As | Al | S | Sb | Cu | Zneq |
| 0.00229 | <0.0005 | 0.196 | 0.00112 | 0.251 | 65.15 | 33.87 |

Stationary casting furnace cooled through water sleeve.

The melting of the materials used for the manufacture of the alloy occurs in electric induction furnaces that bring the broth to a temperature of 1100° C., and after a homogenization period it reaches a discharge temperature of 1010° C.; the broth is poured into a vertical mold and cooled by means of a sleeve with water circulation.

To maintain an acceptable machining level but maintaining it is necessary to add in small percentages elements that will help the machining, and tin and silicon are the ones that had the best performance against the loss of zinc. Achieving a Machinability of 65%.

Hot Extrusion Process (4 mm Wire Formation)

Extrusion is a process used to create objects with defined and fixed cross section. The material is pushed or withdrawn through a die (extrusion die) with a cross section having the geometry of the desired product, the metal then flows in the direction of the piston movement in the case of direct extrusion and in the opposite direction for the case of indirect extrusion.

In the case of brass, given the strong deformations of which the material is subjected and therefore the excessive stress to which it is subjected, the process is carried out by hot extrusion. In this process the ingot that is subjected to extrusion is previously heated.

Because of the type of flow caused during this process, the beta phase bands will be directed (elongated) in the longitudinal direction to the flow of the material during extrusion.

Bar Stretch

The last step of the manufacturing process is obtaining the mechanical properties and adjustment of tolerances of the material, which is achieved by cold deformation, making a material pass through the geometry previously manufactured in a die. The stretching process is practically the same as the extrusion process, with the difference that in stretch ing the material is pulled through the tool, while the material is pushed in extrusion.

Metallographic Study of the 4 mm Wire.

Figure 2:
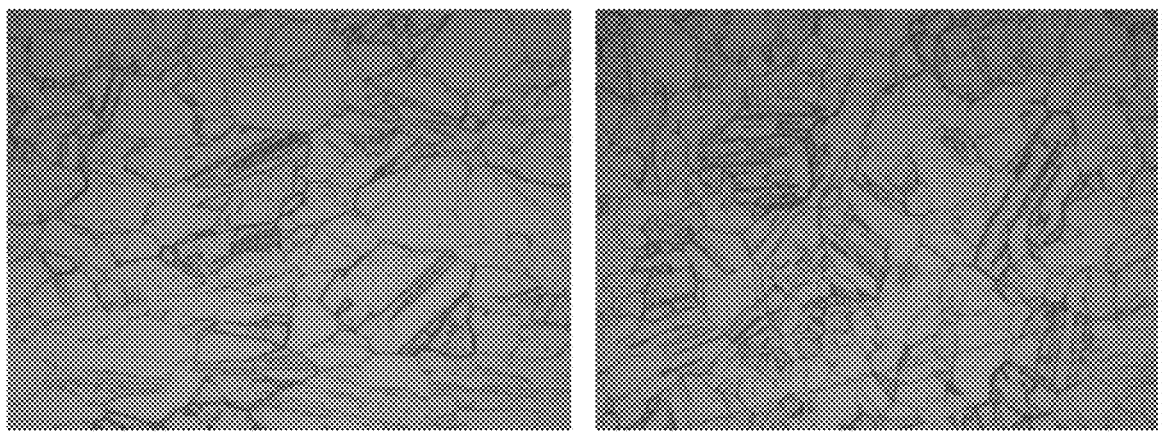
FIG. 2 micrograph of the 4 mm wire, a) longitudinal section and b) cross section, 500×
Figure 3:
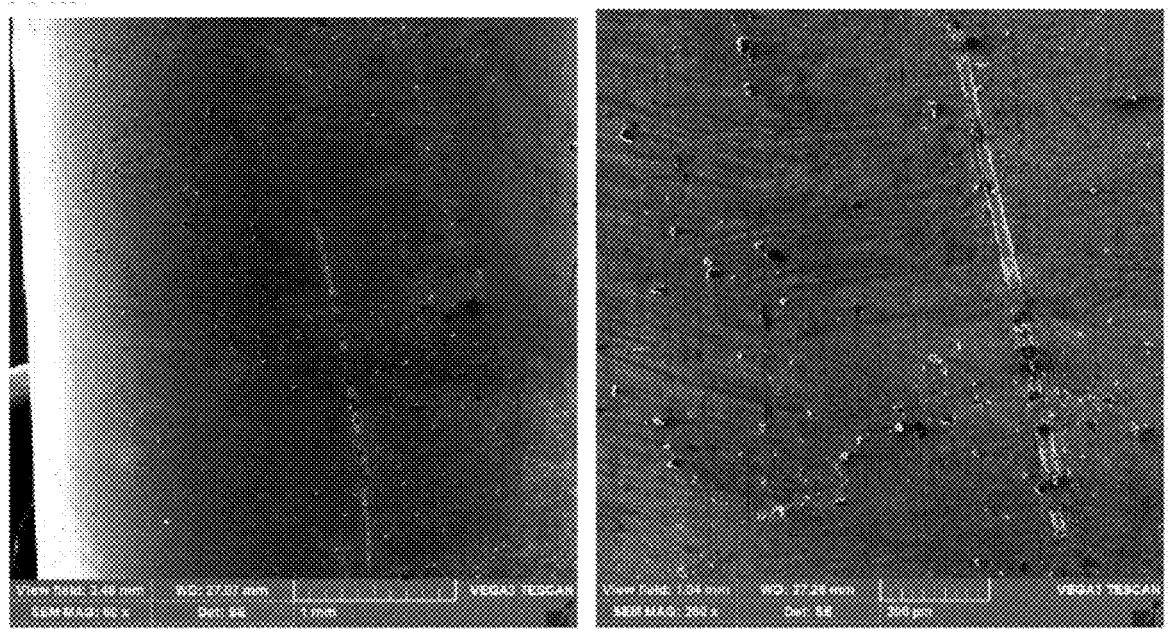
FIG. 3 SEM micrograph, surface termination, 500×.
Figure 4:
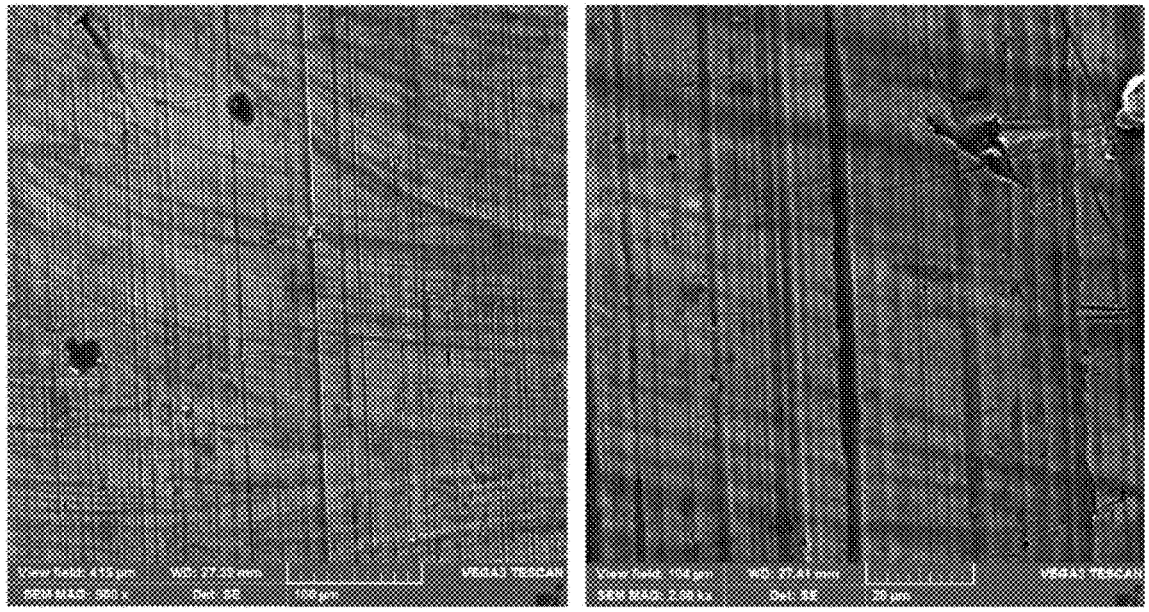
FIG. 4 SEM micrograph, surface termination, 500×.
Figure 5:
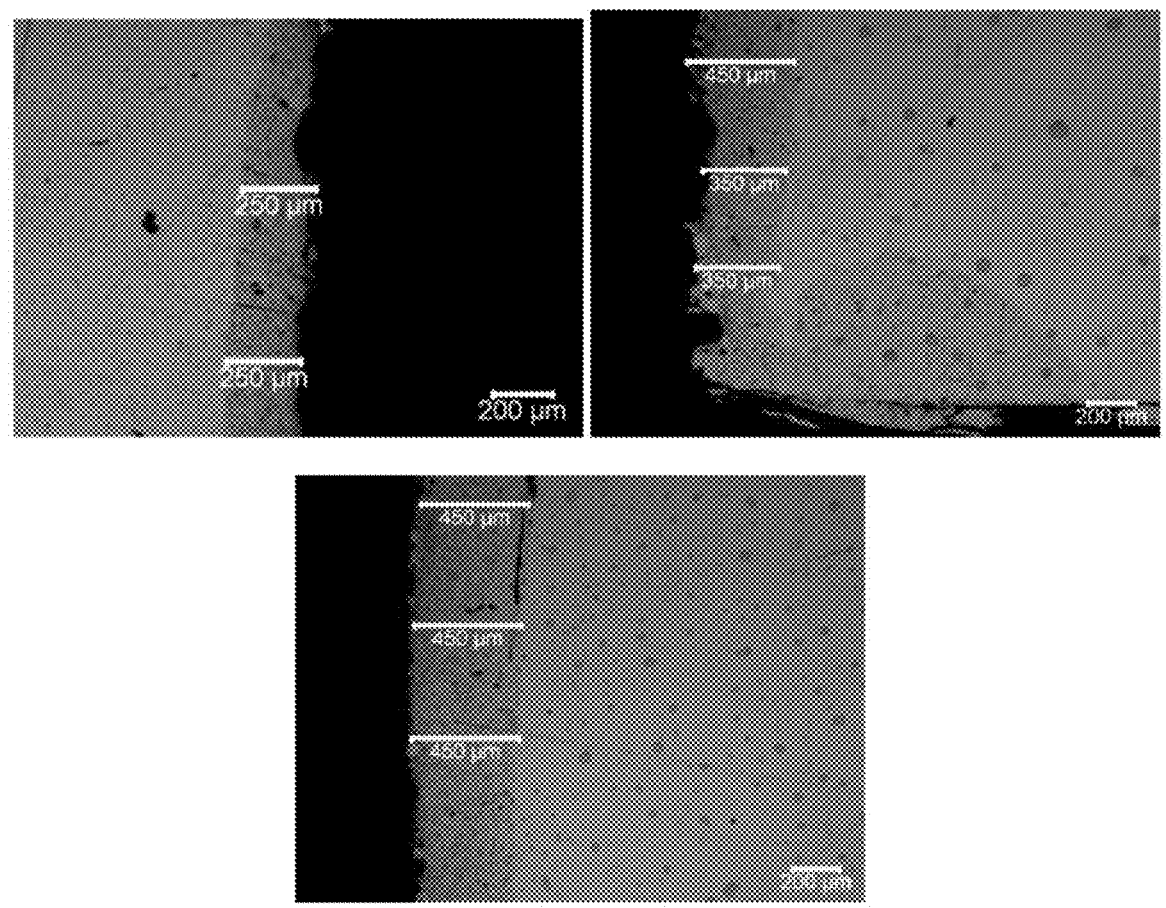
FIG. 5 Longitudinal and cross section micrograph, dezincified layer measurement, 50×

The samples are cut longitudinally and transversely to then be polished and etched and finally observe in a light microscope and conduct a microstructure characterization. FIGS. 1 and 2 show the constituent microstructure of the wire alloy, which is formed by alpha phase. Recrystallized (twinned) alpha phase grains and cold work deformation bands are observed. Table 2 shows the average grain size of the alpha phase.

TABLE 2

| Grain size measurement, microns | |
|---|---|
| Measurement No. | Grain size value μm |
| 1 | 32.8 |
| 2 | 35.5 |
| 3 | 31.9 |
| 4 | 32.5 |
| 5 | 32.4 |
| Average | 33.0 |

Table 3 shows the results of the 4 mm wire tensile tests.

TABLE 3

| Summary of Mechanical Properties | | | | | |
|---|---|---|---|---|---|
| IDEM | Initial area (mm²) | Maximum load (Kgf) | Maximum stress (Mpa) | Elongation of 50 mm (%) | Area reduction (%) |
| 4 mm wire | 12.56 | 747.8 | 583.5 | 31.0 | 73.7 |

Table 4 shows the transverse and longitudinal VICKERS microhardness measurement of the 4 mm wire
EQUIPMENT: Buehler micro durometer
SCALE: Vickers, 300 g
STANDARD: ASTM E-384

TABLE 4

| Vickers microhardness, longitudinal section. | |
|---|---|
| Indent | HV Value |
| 1 (center) | 135.8 |
| 2 | 137.9 |
| 3 | 135.3 |
| 4 | 138.9 |
| 5 | 136.6 |
| 6 (edge) | 143.3 |
| Average | 138 |

TABLE 5

| Vickers microhardness, cross section | |
|---|---|
| Indent | HV Value |
| 1 (center) | 137.4 |
| 2 | 123.2 |
| 3 | 136.1 |
| 4 | 145.9 |
| 5 | 159.0 |
| 6 (edge) | 146.1 |
| Average | 141.3 |

Table 6 shows the transverse and longitudinal ROCKWELL hardness measurement of the 4 mm wire.

TABLE 6

| Surface hardness test, Rockwell B | |
|---|---|
| Direction of measurement | HRB Value: |
| Longitudinal | 74 |
| Longitudinal | 77 |
| Cross | 66 |
| Cross | 72 |
| Average | 72 |

From the microstructure point of view, the wire made from the alloy object of the present invention has a fine and homogeneous grain with an average grain size of 33 μm, see FIGS. 1-2 and table 2. FIGS. 1 and 2 show twinned alpha phase.

The tensile strength properties of the 4 mm wire are 583.5 MPa and 31% elongation, see table 3.

The hardness results in an average value of 72 HRB, see table 6. Microhardness results in 141.3 HV in cross section and 138 HV in longitudinal section and on average 140 HV.

The dezincification phenomenon is basically a loss of zinc (FIG. 7) on the brass in contact with stagnant waters, slightly acidic waters or waters that move at low speed, leaving a porous mass with a very low mechanical resistance. Such phenomenon is seen accelerated as the temperature increases. FIG. 7 shows the dezincified layer made according to the corrected ISO 6509 standard, where a 375 μm dezincification layer can be seen.

There are correct manufacturing variables. Therefore, the wire manufactured from the alloy object of the present invention shows an adequate behavior in use for the manufacturing of cages for aquaculture.

The invention claimed is:

1. A composition of matter comprises between about 64% to 66.15% by weight of Cu; between 32% to 34.5% by weight of Zinc; 0.00229% by weight of Si, 0.00112% by weight of S, and with an impurity content of 0.5% to 2% by weight consisting essentially of Pb, Sn, Ni, Sb, and Fe.

2. A composition of a ter comprising (% by weight):

| Zn | Pb | Sn | P | Mn | Fe | Ni |
|---|---|---|---|---|---|---|
| 32.63 | 0.00786 | 0.534 | 0.00344 | <0.001 | 0.0281 | 1.20 |
| Si | As | Al | S | Sb | Cu | $Zn_{eq}$ |
| 0.00229 | <0.0005 | 0.196 | 0.00112 | 0.251 | 65.15 | 33.87 |

3. A composition of matter according to claim 1, having a fine and homogeneous grain with an average grain size of 33 μm.

4. A useful wire for the manufacture of cages for aquaculture, manufactured with an alloy comprising about 64% to 66.15% by weight of Cu; between 32% to 34.5% by weight of Zinc; 0.00229% by weight of Si, 0.00112% b weight of S and with an impurity content of 0.5% to 2% by weight consisting essentially of Pb, Sn, Ni, Sb, and Fe.

5. A useful wire for the manufacture of cages for aquaculture, made of the copper-zinc alloy of claim 2.

6. A wire according to claim 4, having properties of tensile strength of 583.5 MPa and 31% elongation.

7. A wire according to claim 4, having an average hardness value of 72 H.R.B. and a micro hardness of 141.3 HV in the cross section and 138 HV in the longitudinal section and on average 140 HV.

8. A process for the manufacture of alloy according to claim 1, comprising melting in a stationary casting furnace cooled by a water sleeve, a mixture of 64% to 66.15% by weight of Cu; of 32% to 34.5% by weight of Zinc, with an impurity content of 0.5% to 2% by weight consisting essentially of Pb, Sn, Ni, Sb and Fe.

9. The process according to claim 8, wherein the furnace is an electric induction furnace that brings the broth to a temperature of 1100° C., so that after a homogenization period, the broth reaches a discharge temperature of 1010° C.

10. The process according to claim 8, wherein the broth is poured into a vertical mold and cooled by means of a sleeve with water circulation.

11. A process for the manufacture of a wire with a composition according to claim 1, wherein the process is carried out by hot extrusion and the stretching process comprises pulling the material with the tool.

* * * * *